(12) United States Patent
Jolliffe et al.

(10) Patent No.: US 6,316,066 B1
(45) Date of Patent: *Nov. 13, 2001

(54) THERMOCHROMIC POLYMERIZABLE MESOGENIC COMPOSITION

(75) Inventors: Emma Jolliffe, Dorset; David Coates, Wimborne, both of (GB)

(73) Assignee: Merck Patent Gesellschaft mit beschrankter Haftung (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/522,708

(22) Filed: Mar. 10, 2000

Related U.S. Application Data

(62) Division of application No. 09/350,993, filed on Jul. 12, 1999, now Pat. No. 6,117,920, which is a continuation of application No. 08/900,533, filed on Jul. 25, 1997, now abandoned.

(30) Foreign Application Priority Data

Jul. 25, 1996 (EP) .................................................. 96112001

(51) Int. Cl.$^7$ ......................... C09K 19/34; C09K 19/38; C09K 19/52; C07D 493/02
(52) U.S. Cl. ...................... 428/1.1; 428/1.5; 252/299.01; 252/299.61; 252/299.62; 252/585; 522/170; 549/464
(58) Field of Search .................... 252/299.1, 585, 252/299.61, 299.62; 428/1.1, 1.5; 522/170; 549/464, 465; 349/106

(56) References Cited

U.S. PATENT DOCUMENTS

| | | | |
|---|---|---|---|
| 5,746,940 | 5/1998 | Coates et al. | 252/299.01 |
| 5,780,629 | * 7/1998 | Etzbach et al. | 544/296 |
| 5,785,889 | 7/1998 | Greenfield et al. | 252/299.01 |
| 5,989,461 | * 11/1999 | Coates et al. | 252/585 |
| 6,099,758 | * 8/2000 | Verrall et al. | 252/585 |
| 6,117,920 | * 9/2000 | Jolliffe et al. | 522/170 |
| B1 6,217,792 | * 4/2001 | Parri et al. | 252/299.61 |

FOREIGN PATENT DOCUMENTS 720041  12/1995  (EP) .

* cited by examiner

Primary Examiner—Shean C. Wu
(74) Attorney, Agent, or Firm—Millen, White, Zelano, & Branigan, P.C.

(57) ABSTRACT

The invention relates to a thermochromic polymerizable mesogenic composition essentially consisting of:

a) a component MA comprising at least one achiral polymerizable mesogenic compound comprising at least one polymerizable functional group, b) a component MB comprising at least one chiral polymerizable mesogenic compound comprising at least one polymerizable functional group, c) a photoinitiator, and d) optionally a dye component, to anisotropic polymers and polymer films with a chiral mesophase obtainable from said thermochromic polymerizable mesogenic composition and to the use of said thermochromic polymerizable mesogenic composition, anisotropic polymers and polymer films for optical information storage, photomasks, decorative pigments, cosmetics, security applications, active and passive optical elements such as polarizers or optical retarders, color filters, scattering displays, adhesives or synthetic resins with anisotropic mechanical properties.

32 Claims, 5 Drawing Sheets

(2 of 5 Drawing Sheet(s) Filed in Color)

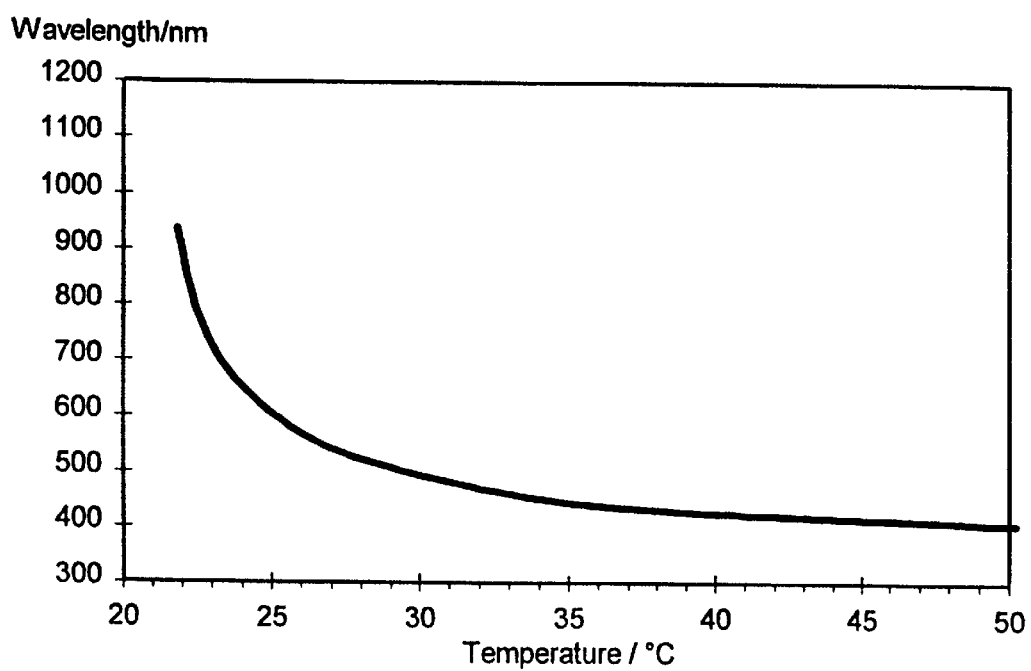
FIG. 1.1

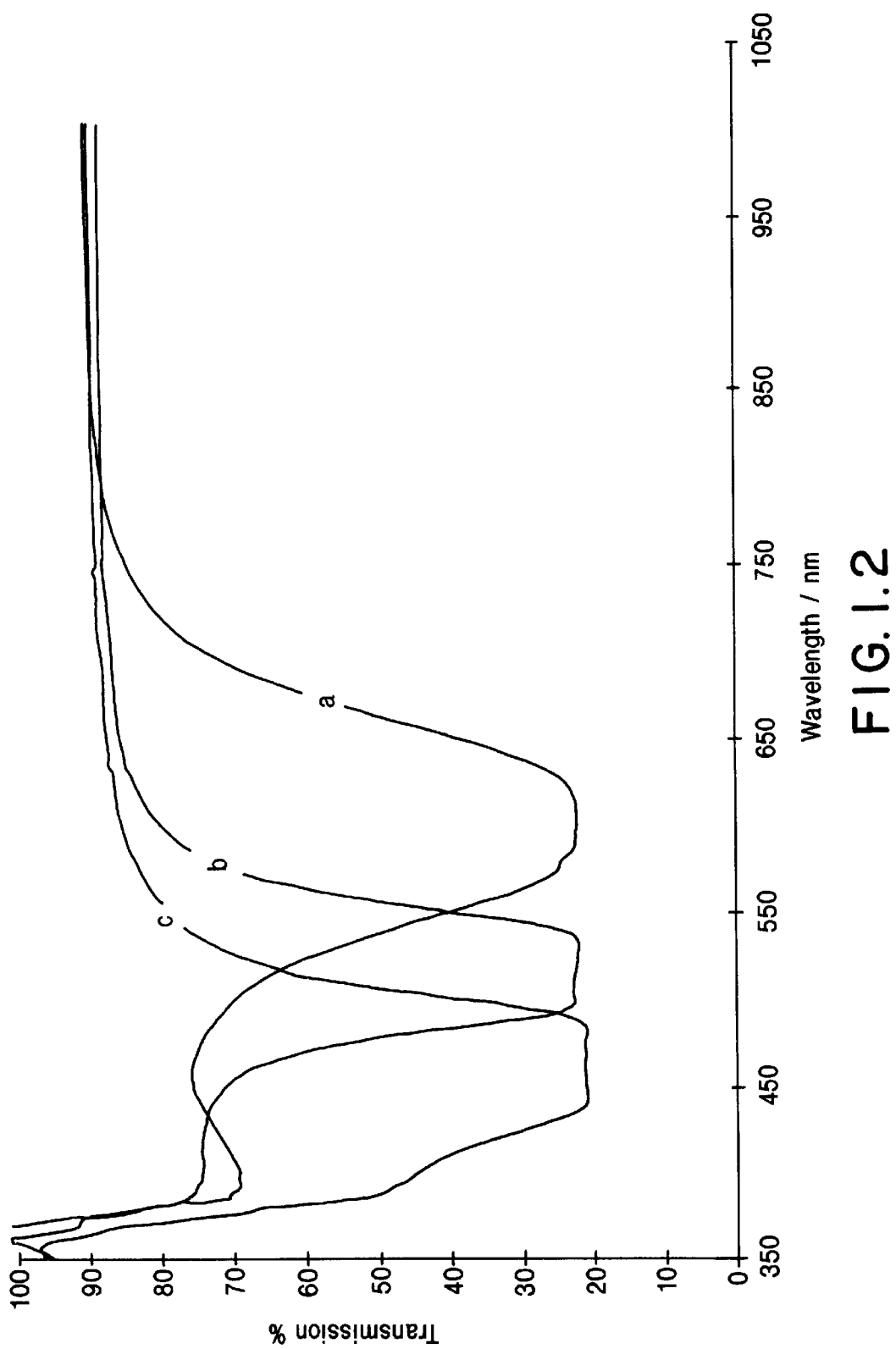
FIG. I.2

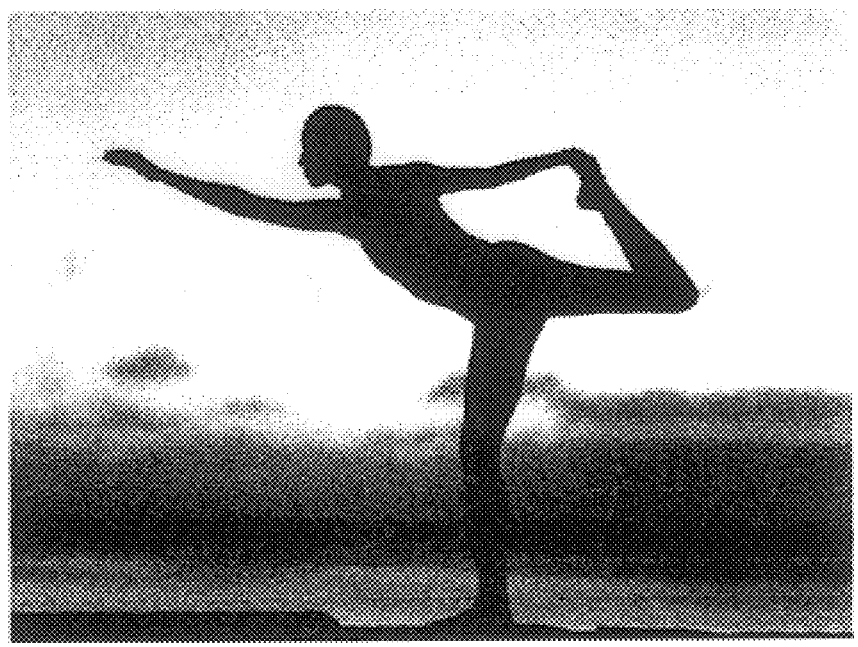
FIG. 4.1
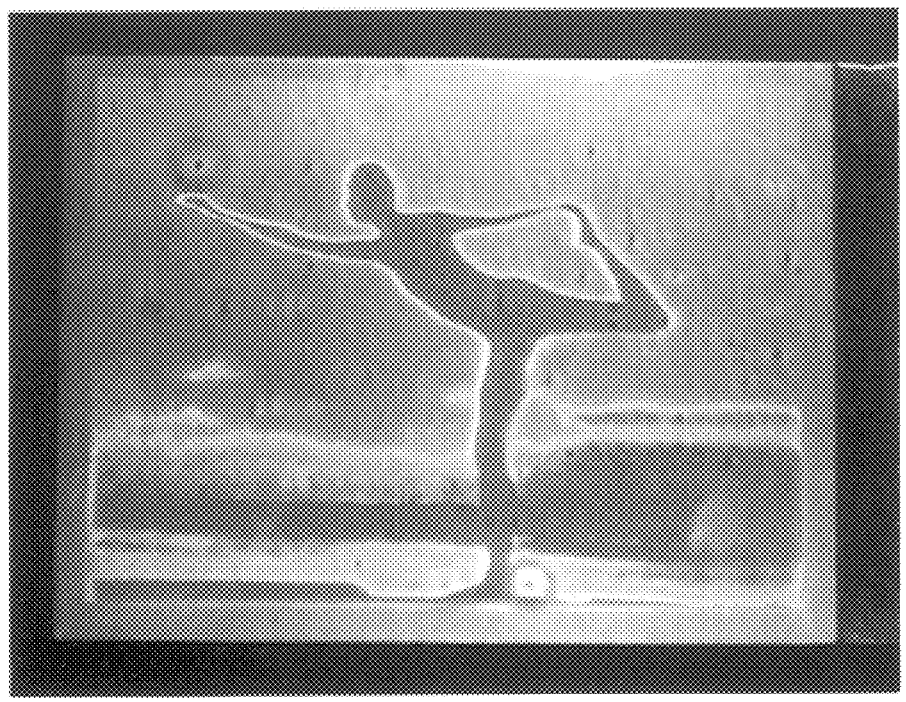
FIG. 4.2

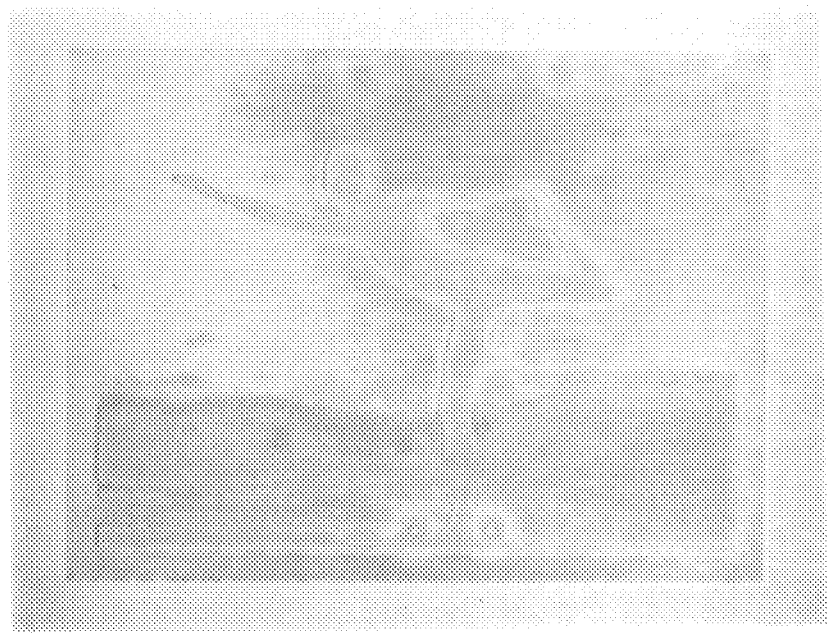
FIG. 4.3
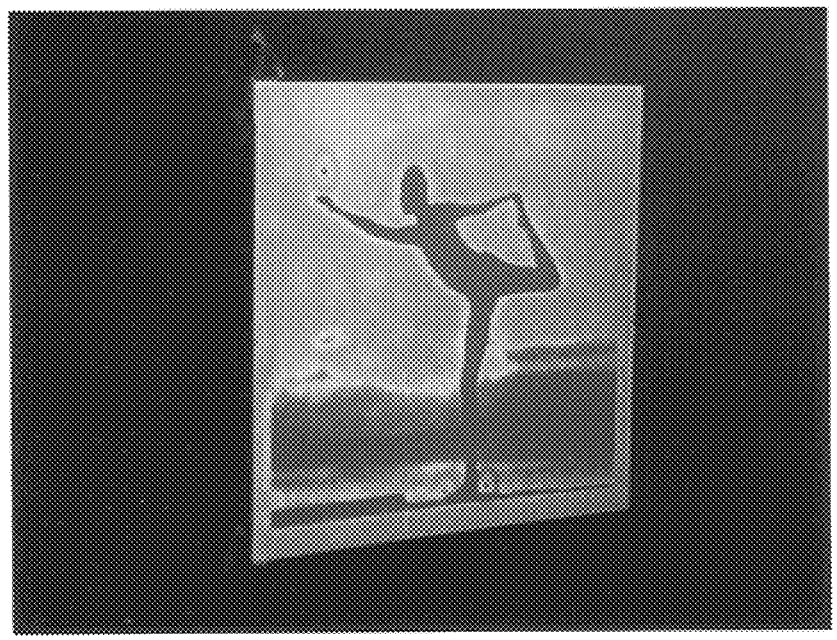
FIG. 4.4

THERMOCHROMIC POLYMERIZABLE MESOGENIC COMPOSITION

This is a division of application Ser. No. 09/350,993 filed Jul. 12, 1999, U.S. Pat. No. 6,117,920, which is a continuation application of Ser. No. 08/900,533, filed Jul. 25, 1997 abandoned.

BACKGROUND OF THE INVENTION

The invention relates to a thermochromic polymerizable mesogenic composition comprising:

a) a component MA comprising at least one achiral polymerizable mesogenic compound comprising at least one polymerizable functional group, b) a component MB comprising at least one chiral polymerizable mesogenic compound comprising at least one polymerizable functional group, c) a photoinitiator, and d) optionally a dye component.

The invention further relates to anisotropic polymers and polymer films with a chiral mesophase obtainable from said thermochromic polymerizable mesogenic composition and to the use of said thermochromic polymerizable mesogenic composition, of said anisotropic polymers and cholesteric polymer films for optical information storage, photomasks, decorative pigments, cosmetics, security applications, active and passive optical elements such as polarizers or optical retarders, color filters, scattering displays, adhesives or synthetic resins with anisotropic mechanical properties.

The term "mechanical properties" is used to distinguish from the electrooptical properties of these materials (like birefringence or dielectric anisotropy), and comprises, e.g., anisotropic material properties such as thermal expansion coefficient, shear modulus, response to external mechanical stress, etc.

Thermochromic compositions, i.e., compositions that show a change of color upon temperature variation, are known in prior art. Usually low molar mass liquid crystals exhibiting a chiral mesophase, like cholesteric liquid crystals (CLCs) are used in thermochromic compositions. These materials exhibit a helically twisted molecular structure and show selective reflection of a specific wavelength band of light, wherein the reflected wavelength maximum varies upon change of the temperature. Such thermochromic compositions are disclosed for example in WO 90/02161.

For many applications, such as the preparation of colored films that can be used as optical films, e.g., patterned color filters, photomasks or films for optical information storage, materials like CLCs are needed wherein the reflected wavelength band remains substantially constant over a wide temperature range.

A suitable material for these applications would be a polymerizable thermochromic composition, wherein the desired pitch length and thereby the waveband reflected from that composition could be easily selected by temperature variation and afterwards the molecular structure with the selected pitch be fixed by polymerization, so that the reflected wavelength remains stable over a wide temperature range.

The European Patent Application EP 0 661 287 A1 discloses polymerizable liquid crystalline siloxanes that show thermochromic behavior and can be polymerized to give linear liquid crystalline polymers with mesogenic side chains.

However, linear polymers and in particular polymers comprising siloxane chains like those disclosed in EP 0 661 287 most often exhibit low glass transition temperatures and show only limited temperature stability. Upon heating of these polymers their optical properties often deteriorate.

Consequently, there has been a considerable demand for a thermochromic material that can be polymerized to give an anisotropic polymer or polymer film with a helical structure that exhibits a higher temperature stability and a reflection wavelength that remains substantially constant over a wide temperature range, and does not have the disadvantages of the materials of prior art as discussed above.

SUMMARY OF THE INVENTION

One of the aims of the present invention is to provide a thermochromic polymerizable mesogenic composition having these properties. Another aim of the invention is to provide an anisotropic polymer or polymer film that can be prepared by polymerization of such a composition. Yet another aim of the invention is a process of preparing a polymer film with a chiral mesophase from such a composition. Another aim of the present invention is to extend the pool of thermochromic polymerizable mesogenic materials available to the expert. Other aims of the present invention are immediately evident to the person skilled in the art from the following detailed description.

It has been found that the above-mentioned aims can be achieved by providing a thermochromic polymerizable mesogenic composition according to the present invention.

The terms polymerizable or reactive mesogen, polymerizable or reactive mesogenic compound or polymerizable or reactive liquid crystal (/line compound) as used in the foregoing and the following comprise compounds with a rodlike, boardlike or disklike mesogenic group. These mesogenic compounds do not necessarily have to exhibit mesophase behavior by themselves. In a preferred embodiment of the present invention they show mesophase behavior in mixtures with other compounds or after polymerization of the pure mesogenic compounds or of the mixtures comprising the mesogenic compounds.

The term "mesogenity supporting group" as used in the foregoing and the following indicates a rod-shaped, board-shaped or disk-shaped group, which does not necessarily have to show mesogenic behavior (i.e., the ability to induce mesophase behavior in a compound comprising such a group) alone. It is also possible that such a group shows mesogenic behavior if being combined in a compound with other groups, or if the compound comprising the mesogenity supporting group is polymerized or admixed with other compounds comprising the same or other mesogenic or mesogenity supporting groups.

Preferably, however, the polymerizable mesogenic compounds exhibit mesophase behavior on their own.

One object of the present invention is a thermochromic polymerizable mesogenic composition comprising:

a) a component MA comprising at least one achiral polymerizable mesogenic compound comprising at least one polymerizable functional group, b) a component MB comprising at least one chiral polymerizable mesogenic compound comprising at least one polymerizable functional group, c) a photoinitiator, and d) optionally a dye component.

The components MA and MB comprise polymerizable mesogenic compounds with at least one polymerizable group. Preferably, these polymerizable mesogenic compounds have up to four, in particular up to three, very preferably one or two polymerizable groups.

The achiral polymerizable compounds of component MA are preferably selected from formula I

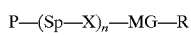  I in which

P is $CH_2=CW-COO-$, $WCH=CH-O-$,

or $CH_2=CH$-phenyl-$(O)_k-$ with W being H, $CH_3$ or Cl and k being 0 or 1,

Sp is a spacer group having 1 to 20 C atoms,

X is a group selected from $-O-$, $-S-$, $-CO-$, $-COO-$, $-OCO-$, $-OCO-O-$, $-S-CO-$, $-CO-S-$ or a single bond, n is 0 or 1, MG is a mesogenic or mesogenity supporting group preferably selected from formula II

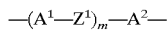  II wherein $Z^1$ is in each case independently $-COO-$, $-OCO-$, $-CH_2CH_2-$, $-OCH_2-$, $-CH_2O-$, $-CH=CH-$, $-CH=CH-COO-$, $-OCO-CH=CH-$, $-C\equiv C-$ or a single bond, $A^1$ and $A^2$ are each independently 1,4-phenylene in which, in addition, one or more CH groups may be replaced by N, 1,4-cyclohexylene in which, in addition, one or two non-adjacent $CH_2$ groups may be replaced by O and/or S, 1,4-cyclohexenylene, or naphthalene-2,6-diyl, it being possible for all these groups to be unsubstituted, mono- or polysubstituted (e.g., up to 4 times) with halogen, cyano or nitro groups or alkyl, alkoxy or alkanoyl groups having 1 to 7 C atoms wherein one or more H atoms may be substituted by F or Cl (e.g., up to perfluoro or perchloro), and m is 1, 2 or 3, and R is an achiral alkyl radical with up to 25 C atoms which may be unsubstituted, mono- or polysubstituted by halogen (up to perhalo) or CN (e.g., up to 4 times), it being also possible for one or more non-adjacent $CH_2$ groups to be replaced, in each case independently from one another, by $-O-$, $-S-$, $-NH-$, $-N(CH_3)-$, $-CO-$, $-COO-$, $-OCO-$, $-OCO-O-$, $-S-CO-$, $-S-CO-$ or $-C\equiv O-$ in such a manner that oxygen atoms are not linked directly to one another, or alternatively R is halogen, cyano or has independently one of the meanings given for P—(Sp—X)$_n$—. The chiral polymerizable compounds of component MB are preferably selected from formula III

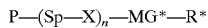  III in which

P, Sp, X and n have the meanings given for formula I,

MG* is a mesogenic or mesogenity supporting group, which is preferably selected from formula II given above, and R* is H or an alkyl radical with up to 25 C atoms which may be unsubstituted, mono- or polysubstituted by halogen (e.g., up to perhalo) or CN (e.g., up to 4 times), it being also possible for one or more non-adjacent $CH_2$ groups to be replaced, in each case independently from one another, by $-O-$, $-S-$, $-NH-$, $-N(CH_3)-$, $-CO-$, $-COO-$, $-OCO-$, $-OCO-O-$, $-S-CO-$, $-S-CO-$ or $-C\equiv C-$ in such a manner that oxygen atoms are not linked directly to one another, or alternatively R* is halogen, cyano or has independently one of the meanings given for P—(Sp—X)$_n$—, wherein at least one of the groups MG* and R* contains at least one chiral structure element, i.e., a chiral carbon atom.

In a preferred embodiment of the present invention, the thermochromic polymerizable mesogenic composition comprises at least one polymerizable mesogenic compound comprising two or more polymerizable functional groups, and is preferably selected from formula I or III.

Another object of the present invention is an anisotropic polymer with a chiral mesophase obtainable by polymerizing a thermochromic polymerizable mesogenic composition as described in the foregoing and the following.

Another object of the invention is a polymer film with a chiral mesophase exhibiting a helically twisted molecular structure that is obtainable by A) coating a thermochromic polymerizable mesogenic composition comprising:
   a) a component MA comprising at least one achiral polymerizable mesogenic compound comprising at least one polymerizable functional group,
   b) a component MB comprising at least one chiral polymerizable mesogenic compound comprising at least one polymerizable functional group,
   c) a photoinitiator, and
   d) optionally a dye component on a substrate or between two substrates in the form of a layer;

B) aligning the polymerizable mesogenic mixture so that the axis of the molecular helix extends transversely to the layer;

C) heating at least a part of the aligned mixture to a defined temperature,

D) polymerizing at least a part of the aligned mixture by exposure to actinic radiation, E) optionally repeating, at least one more time, (D) alone or in combination with (C) or (A), (B) and (C), and F) optionally removing the substrate or, if present, one or two of the substrates from the polymerized material.

Yet another object of the present invention is a polymer film with a chiral mesophase obtainable by the process described above wherein at least one region of the film exhibits a pitch of the molecular helix that is different from at least one other region of the film.

Another object of the present invention is the use of a thermochromic polymerizable mesogenic composition, an anisotropic polymer having a chiral mesophase or an anisotropic polymer film having a chiral mesophase as described above and below for optical information storage, photomasks, decorative pigments, cosmetics, security applications, active and passive optical elements such as polarizers or optical retarders, color filters, scattering displays, adhesives or synthetic resins with anisotropic mechanical properties, In the compounds of formulae I and III, P is

CH$_2$=CW—COO, WCH=CH—O— or CH2=CH-phenyl-(O)$_k$— with W being H, CH$_3$ or Cl and k being 0 or 1.

Preferably, P is a vinyl group, an acrylate or methacrylate group, a propenyl ether group or an epoxy group. Especially preferably P is an acrylate or methacrylate group.

MG in formula I and MG* in formula III are preferably of formula II. Formula II includes the bicyclic, tricyclic and tetracyclic mesogenic groups of the subformulae II1–II3:

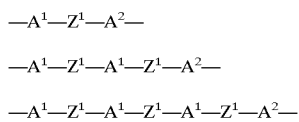

Bicyclic and tricyclic mesogenic groups of formula II are particularly preferred.

Of the mesogenic groups wherein A$^1$ and/or A$^2$ denote a heterocyclic group, those containing a pyridine-2,5-diyl group, pyrimidine-2,5-diyl group or 1,3-dioxane-2,5-diyl group are particularly preferred.

Of the preferred mesogenic groups containing a substituted 1,4-phenylene group very particularly preferred are those substituted by F, Cl or an optionally fluorinated alkyl, alkoxy or alkanoyl group with 1 to 4 C atoms.

A smaller group of particularly preferred mesogenic groups of the formula II1, II2 and II3 is listed below. For reasons of simplicity, PheL is 1,4-phenylene, which is substituted in 2- and/or 3-position with L, wherein L denotes halogen, a cyano or nitro group or an alkyl, alkoxy or alkanoyl group having 1 to 7 C atoms wherein one or more H atoms may be substituted by F or Cl. Furthermore, Pyd is pyridine-2,5-diyl, Pyr is pyrimidine-2,5-diyl, Cyc is 1,4-cyclohexylene, Cyh is 1,4-cyclohexenylene, Dio is trans-1,3-dioxane-2,5-diyl, Dit is trans-1,3-dithiane-2,5-diyl and Nap is a naphthalene-2,6-diyl group.

The notations Pyd, Pyr, Dio and Dit in each case include the two possible positional isomers.

Z$^1$ in these groups, unless otherwise indicated, has the meaning given in formula I as described above and below.

Preferred two-ring mesogenic groups are those of formulae II1 to II1-27:

| | |
|---|---|
| -Phe-Z$^1$-Phe- | II1-1 |
| -Phe-Z$^1$-PheL- | II1-2 |
| -PheL-Z$^1$-PheL- | II1-3 |
| -Phe-Z$^1$-Cyc- | II1-4 |
| -Cyc-Z$^1$-Phe- | II1-5 |
| -Cyc-Z$^1$-PheL- | II1-6 |
| -Cyc-Z$^1$-Cyc- | II1-7 |
| -Phe-Z$^1$-Pyd- | II1-8 |
| -Phe-Z$^1$-Pyr- | II1-9 |
| -PheL-Z$^1$-Pyd- | II1-10 |
| -PheL-Z$^1$-Pyr- | II1-11 |
| -Pyd-Z$^1$-Pyr- | II1-12 |
| -Pyd-Z$^1$-Pyd- | II1-13 |
| -Phe-Z$^1$-Dio- | II1-14 |
| -PheL-Z$^1$-Dio- | II1-15 |
| -Phe-Z$^1$-Dit- | II1-16 |
| -PheL-Z$^1$-Dit- | II1-17 |
| -Phe-Z$^1$-Cyh- | II1-18 |
| -PheL-Z$^1$-Cyh- | II1-19 |

-continued

| | |
|---|---|
| -Dio-Z$^1$-Dit- | II1-20 |
| -Dio-Z$^1$-Dio- | II1-21 |
| -Phe-Z$^1$-Nap- | II1-22 |
| -PheL-Z$^1$-Nap- | II1-23 |
| -Nap-Z$^1$-Phe- | II1-24 |
| -Nap-Z$^1$-PheL- | II1-25 |
| -Nap-Z$^1$-Cyc- | II1-26 |
| -Pyd-Z$^1$-Nap- | II1-27 |

In the formula II1-1 to II1-27, Z$^1$ is preferably an ester group (—CO—O— or —O—CO—), —CH$_2$CH$_2$— or a single bond.

Of the mesogenic groups of formulae II1-1 to II1-27, those of formulae II1-1 to II1-13 are preferred. Especially preferred are the mesogeric groups of formulae II1-1 to II1-7, in particular those of formulae II1-1 to II11-4.

Preferred three-ring mesogenic groups are those of the formulae II2-1 to II2-23:

| | |
|---|---|
| -Phe-Z$^1$-Phe-Z$^1$-Phe- | II2-1 |
| -PheL-Z$^1$-Phe-Z$^1$-Phe- | II2-2 |
| -Phe-Z$^1$-Phe-Z$^1$-PheL- | II2-3 |
| -Phe-Z$^1$-PheL-Z$^1$-Phe- | II2-4 |
| -PheL-Z$^1$-Phe-Z$^1$-PheL- | II2-5 |
| -PheL-Z$^1$-PheL-Z$^1$-PheL- | II2-6 |
| -Phe-Z$^1$-PheL-Z$^1$-PheL- | II2-7 |
| -PheL-Z$^1$-PheL-Z$^1$-Phe- | II2-8 |
| -Phe-Z$^1$-Phe-Z$^1$-Cyc- | II2-9 |
| -PheL-Z$^1$-Phe-Z$^1$-Cyc- | II2-10 |
| -Phe-Z$^1$-Cyc-Z$^1$-Phe- | II2-11 |
| -PheL-Z$^1$-Cyc-Z$^1$-Phe- | II2-12 |
| -Cyc-Z$^1$-Cyc-Z$^1$-Phe- | II2-13 |
| -Cyc-Z$^1$-Phe-Z$^1$-Phe- | II2-14 |
| -Phe-Z$^1$-Phe-Z$^1$-Cyc- | II2-15 |
| -Phe-Z$^1$-Pyd-Z$^1$-Phe- | II2-16 |
| -Phe-Z$^1$-Pyr-Z$^1$-Phe- | II2-17 |
| -Phe-Z$^1$-Phe-Z$^1$-Pyr- | II2-18 |
| -Phe-Z$^1$-Phe-Z$^1$-Pyd- | II2-19 |
| -Phe-Z$^1$-PheL-Z$^1$-Pyd- | II2-20 |
| -Phe-Z$^1$-PheL-Z$^1$-Pyr- | II2-21 |
| -Phe-Z$^1$-Pyd-Z$^1$-PheL- | II2-22 |
| -Phe-Z$^1$-Pyr-Z$^1$-PheL- | II2-23 |

Of the mesogenic groups of formulae II2-1 to II2-23, those of formulae II2-1 to II2-15 are preferred. Especially preferred are the mesogenic groups of formulae II2-1 to II2-10, in particular those of formulae II2-1 to II2-4, II2-9 and II2-10.

In particular, preferred are the compounds of formulae II2-1 to II2-23 in which Z$^1$ is independently from each other —COO—, —OCO— or a single bond.

Of these preferred compounds, very particularly preferred are those of formula II2-4, wherein PheL is especially preferably a 1,4-phenylene group substituted by an optionally fluorinated alkyl, alkoxy or alkanoyl group with 1 to 4 C atoms.

Preferred four-ring mesogenic groups are those of the formulae II3-1 to II3-12:

| | |
|---|---|
| -Phe-Z$^1$-Phe-Z$^1$-Phe-Z$^1$-Phe- | II3-1 |
| -Phe-Z$^1$-Phe-Z$^1$-Phe-Z$^1$-PheL- | II3-2 |
| -Phe-Z$^1$-Phe-Z$^1$-PheL-Z$^1$-Phe- | II3-3 |
| -Phe-Z$^1$-PheL-Z$^1$-Phe-Z$^1$-Phe- | II3-4 |
| -PheL-Z$^1$-Phe-Z$^1$-Phe-Z$^1$-Phe- | II3-5 |
| -Phe-Z$^1$-PheL-Z$^1$-PheL-Z$^1$-Phe- | II3-6 |
| -Phe-Z$^1$-Phe-Z$^1$-Phe-Z$^1$-Cyc- | II3-7 |

| | |
|---|---|
| -Phe-$Z^1$-Cyc-$Z^1$-Phe-$Z^1$-Phe- | II3-8 |
| -Phe-$Z^1$-Cyc-$Z^1$-Phe-$Z^1$-Cyc- | II3-9 |
| -Cyc-$Z^1$-Phe-$Z^1$-Phe-$Z^1$-Cyc- | II3-10 |
| -Phe-$Z^1$-PheL-$Z^1$-Phe-$Z^1$-Cyc- | II3-11 |
| -PheL-$Z^1$-PheL-$Z^1$-Phe-$Z^1$-Cyc- | II3-12 |

Of the mesogenic groups of formulae II3-1 to II3-12, those of formulae II3-1 to II3-4, II3-7 and II3-10 are preferred. Especially preferred are the mesogenic groups of formulae II3-1 to II3-4.

In the mesogenic groups of the formulae II3-1 to II3-12, at least one of the groups $Z^1$ is very particularly preferably a single bond.

In the formulae II-1 to I1-27, II2-1 to II2-23 and II3-1 to II3-12, L is preferably F, Cl, CN, $NO_2$, $CH_3$, $C_2H_5$, $OCH_3$, $OC_2H_5$, $COCH_3$, $COC_2H_5$, $CF_3$, $OCF_3$, $OCHF_2$, $OC_2F_5$, in particular, F, Cl, CN, $CH_3$, $C_2H_5$, $OCH_3$, $COCH_3$ and $OCF_3$, most preferably F, $CH_3$, $OCH_3$ and $COCH_3$.

Particularly preferably MG and MG* are selected from the following formulae:

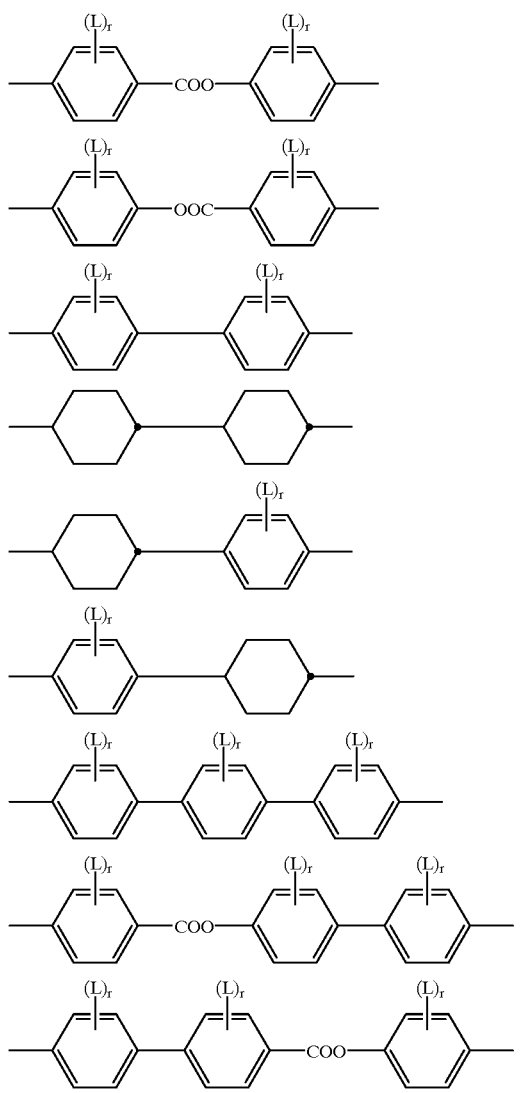

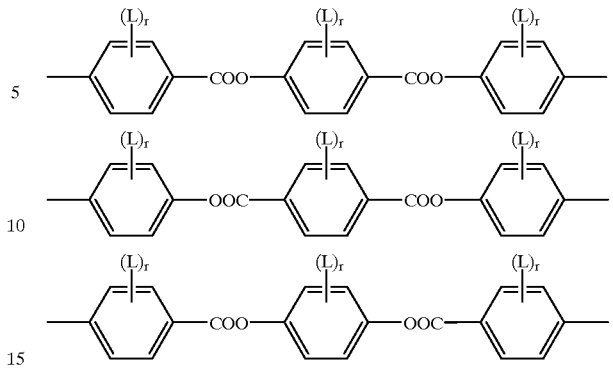

wherein L has the meaning given above and r is 0, 1 or 2.
The group

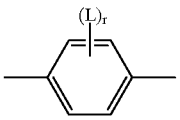

in this preferred formula is preferably denoting

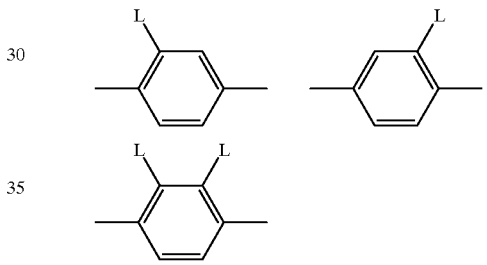

furthermore

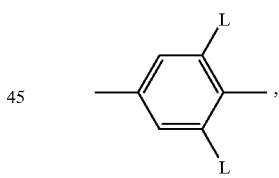

with L having each independently one of the meanings given above.

In the achiral polymerizable mesogenic compounds of the formula I, R is preferably an achiral alkyl radical which is unsubstituted or substituted by at least one halogen atom, it being possible for one or two non-adjacent $CH_2$ groups of these radicals to be replaced by —O—, —S—, —O—CO—, —CO—O— or —O—CO—O— groups.

Halogen is preferably F or Cl.

If R is an alkyl or alkoxy radical, i.e., where the terminal $CH_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e., where one CH$_2$ group is replaced by —O—, is preferably straight-chain 2-oxapropyl(=methoxymethyl), 2-(=ethoxymethyl) or 3-oxabutyl (=2-methoxyethyl), 2-, 3- or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

In the polymerizable mesogenic compounds of formula III, R* may be an achiral or a chiral group. In the case of a chiral group, it is preferably selected according to the following formula IV:

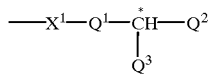

IV wherein

X$^1$ has the meaning given for X,

Q$^1$ is an alkylene or alkylene-oxy group with 1 to 10 C atoms or a single bond, Q$^2$ is an alkyl or alkoxy group with 1 to 10 C atoms which may be unsubstituted, mono- or polysubstituted by halogen or CN, it being also possible for one or more non-adjacent CH$_2$ groups to be replaced, in each case independently from one another, by —C≡C—, —O—, —S—, —NH—, —N(CH$_3$)—, —CO—, —COO—, —OCO—, —OCO—O—, —S—CO— or —S—CO— in such a manner that oxygen atoms are not linked directly to one another, or alternatively has the meaning given for P—Sp—, Q$^3$ is halogen, a cyano group or an alkyl or alkoxy group with 1 to 4 C atoms different from Q$^2$.

Preferred chiral groups R* are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, for example.

In addition, mesogenic compounds of the formula I and/or III containing an achiral branched group R or R* respectively may occasionally be of importance as comonomers, for example, due to a reduction in the tendency toward crystallization. Branched groups of this type, e.g., may contain one chain branch. Preferred achiral branched groups are isopropyl, isobutyl (=methylpropyl), isopentyl (=3-methylbutyl), isopropoxy, 2-methylpropoxy and 3-methylbutoxy.

In another preferred embodiment, R* in formula III is a chiral group that is selected from the following groups:

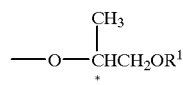

wherein R$^1$ is an alkyl radical with 1 to 12 C atoms, or a group based on citronellol

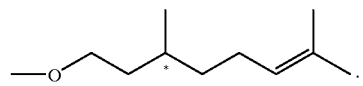

In another preferred embodiment of the present invention, the compounds of formula III comprise a mesogenic or mesogenity supporting group MG* having at least one center of chirality. In these compounds, MG* is preferably selected according to formula IIa or IIb:

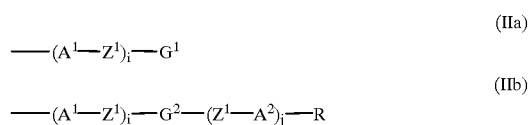

wherein

A$^1$, A$^2$ and Z$^1$ have the meaning given in formula II,

R has the meaning given in formula I, i and j are independently of each other 0, 1 or 2, G$^1$ is a terminal chiral group such as for example a cholesteryl group,

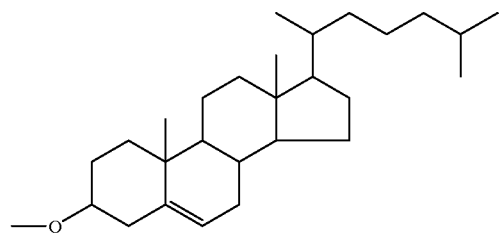

a terpenoid radical, for example as disclosed in WO 96/17901, particularly preferably a menthyl group, a terminal chiral sugar or sugar-like group comprising a mono- or dicyclic radical with pyranose or furanose rings, for example, a terminal group derived from the chiral sugar or sugar-like groups as disclosed in WO 95/16007, and G$^2$ is a bivalent chiral group, for example, a bivalent chiral sugar or sugar derivative or another bivalent chiral radical as disclosed, e.g., in WO 95/16007, especially preferably a group based on 1,4:3,6-dianhydro-D-sorbitol:

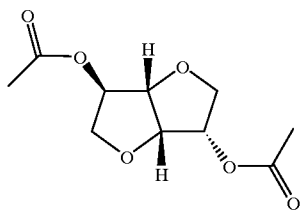

In the case where $G^2$ is a group based on 1,4:3,6-dianhydro-D-sorbitol as disclosed above, $Z^1$ is prerably —CH=CH—.

As for the space group Sp, all groups can be used that are known for this purpose to the skilled in the art. The spacer group Sp is preferably linked to the polymerizable group P by an ester or ether group or a single bond. The spacer group Sp is preferably a linear or branched alkylene group having 1 to 20 C atoms, in particular 1 to 12 C atoms, in which, in addition, one or more (e.g., 1–5) non-adjacent $CH_2$ groups may be replaced by —O—, —S—, —NH—, —N($CH_3$)—, —CO—, —O—CO—, —S—CO—, —O—COO—, —S—CO—, —CO—O—, —CH(halogen)—, —CH(CN)—, —CH=CH— or —C≡C—.

Typical spacer groups Sp are, for example, —$(CH_2)_o$—, —$(CH_2CH_2O)_r$—$CH_2CH_2$, —$CH_2CH_2$—S—$CH_2CH_2$— or —$CH_2CH_2$—NH—$CH_2CH_2$—, with o being an integer from 2 to 12 and r being an integer from 1 to 3.

Preferred spacer groups Sp are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyliminoethylene and 1-methylalkylene, for example.

In a preferred embodiment of the invention, the polymerizable mesogenic compounds of formula III comprise a spacer group Sp that is a chiral group of the formula V:

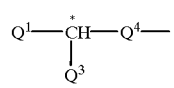

wherein
$Q^1$ and $Q^3$ have the meanings given in formula IV, and
$Q^4$ is an alkylene or alkylene-oxy group with 1 to 10 C atoms or a single bond, being different from $Q^1$.

In particular, preferred are compounds of formula I and/or III wherein n is 1.

In a preferred embodiment, the inventive anisotropic polymers and cholesteric polymer films are obtained by copolymerizing mixtures comprising compounds of formula I and/or formula III wherein n is 0 and compounds of formula I and/or formula III wherein n is 1.

In the event that R, R* or $Q^2$ is a group of formula P—Sp—X— or P—Sp— respectively, the spacer groups on each side of the mesogenic core may be identical or different.

Polymerizable mesogenic compounds according to formulae I and III are described for example in WO 93/22397, EP 0 261 712, DE 195 04 224, DE 44 08 171 or DE 44 05 316. The compounds disclosed in these documents, however, are to be regarded merely as examples that shall not limit the scope of this invention.

Furthermore, typical examples representing polymerizable mesogenic compounds of formulae I and III are shown in the following list of compounds, which should, however, be taken only as illustrative and is in on way intended to restrict, but instead to explain the present invention:

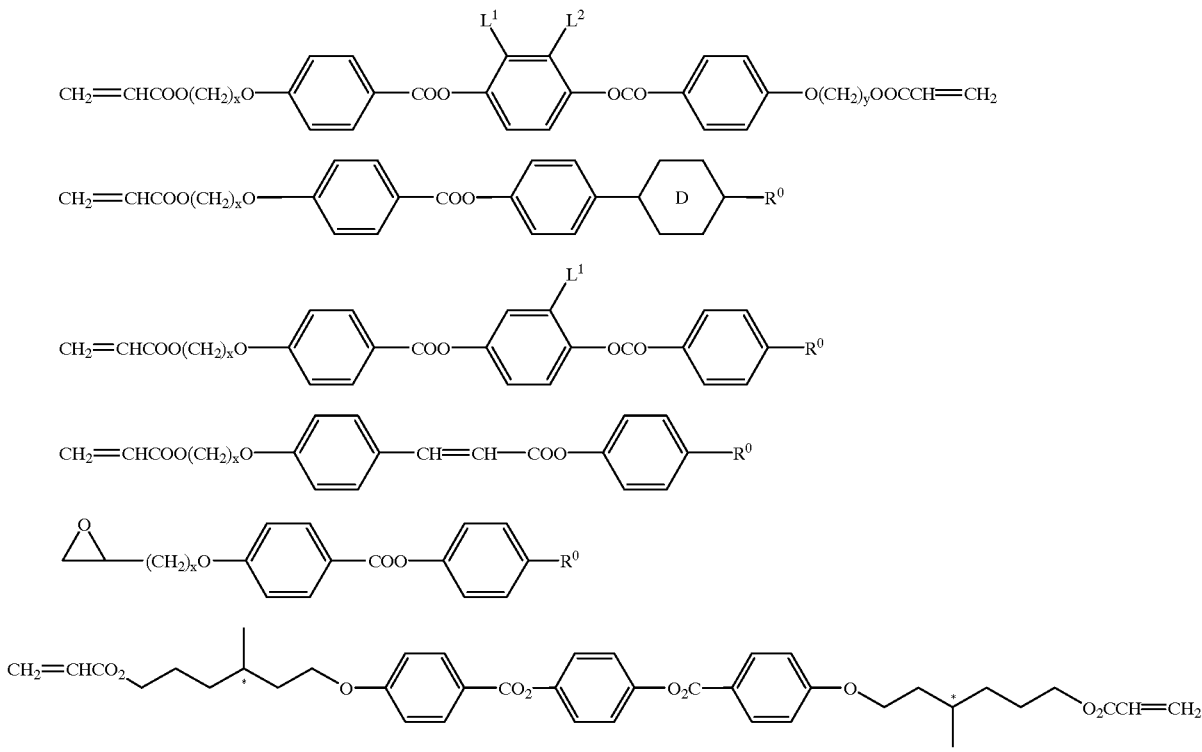

-continued

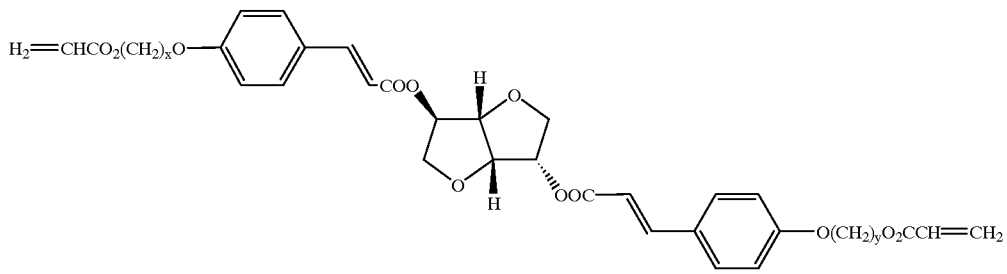

wherein x and y are each independently 1 to 12, D is a 1,4-phenylene or 1,4-cyclohexylene group $R^0$ is halogen, cyano or a chiral or achiral alkyl or alkoxy group with 1 to 12 C atoms and $L^1$ and $L^2$ are each independently H, halogen, CN or an alkyl, alkoxy or alkanoyl group with 1 to 7 C atoms.

In a preferred embodiment of the present invention, the thermochromic polymerizable mesogenic composition comprises the following components:

- a1) 10 to 80% by weight of component MA1 comprising at least one achiral polymerizable mesogenic compound according to formula I having one polymerizable functional group,
- a2) 0 to 70% by weight of component MA2 comprising at least one achiral polymerizable mesogenic compound according to formula I having two or more polymerizable functional groups,
- b1) 10 to 95% by weight of component MB1 comprising at least one chiral polymerizable mesogenic compound according to formula III having one polymerizable functional group,
- b2) 0 to 30% by weight of component MB2 comprising at least one chiral polymerizable mesogenic compound according to formula III having two or more polymerizable functional groups,
- c) 0.01 to 5% by weight of a photoinitiator, and
- d) 0 to 20% by weight of a dye component.

In a particularly preferred embodiment of the present invention, the thermochromic polymerizable mesogenic composition comprises:

- a1) 10 to 80%, preferably 15 to 65%, in particular 20 to 50% by weight of two or more achiral polymerizable mesogenic compounds of component MA1,
- a2) 1 to 70%, preferably 2 to 55%, in particular 4 to 40% by weight of at least one achiral polymerizable mesogenic compound of component MA2,
- b1) 10 to 95%, preferably 15 to 90%, in particular 20 to 80% by weight of two or more chiral polymerizable mesogenic compounds of component MB1, and further comprises component c) and optionally components b2) and d) in the concentration ranges as described above.

Compositions according to this particularly preferred embodiment are preferred that comprise two to eight, in particular two to six, most preferably two to four different compounds of component MA1 and two to eight, in particular two to six, most preferably two to four different compounds of component MB1 as described above.

The ratio of each of the compounds of component MA1 in the mixture according to this particularly preferred embodiment is preferably 5 to 75%, in particular 8 to 65%, very preferably 10 to 55% by weight of the total mixture.

The ratio of each of the compounds of component MB1 in the mixture according to this particularly preferred embodiment is preferably 5 to 90%, in particular 8 to 80%, very preferably 10 to 70% by weight of the total mixture.

Furthermore, preferred are compositions according to this particularly preferred embodiment that comprise at least one compound of component MA2 in the concentration range as described above.

Further preferred are compositions according to the preferred embodiments described above that additionally comprise 0 to 30%, preferably 0.1 to 20%, in particular 0.5 to 15% by weight of at least one non-polymerizable chiral or chiral mesogenic compound, e.g., a chiral dopant.

In the compositions comprising two or more different compounds of component MB1 and MB1 that are selected of formula I and III as described above, preferably each of the different compounds according to formula I and III is different in at least one of the groups P, Sp, X, MG, MG*, R or R* from each other of the compounds of the same component.

In another preferred embodiment of the present invention, the thermochromic polymerizable compositions contain less than 10% by weight, very especially preferably none of the compounds of component MA2 and MB2.

Another object of the present invention is anisotropic polymers with a chiral mesophase that can be prepared by polymerization of an inventive thermochromic polymerizable mesogenic composition according to the present invention. Polymerization can be carried out as polymerization in solution or as in situ polymerization.

Preferably, the anisotropic polymers are prepared as thin films by in situ polymerization of inventive thermochromic polymerizable mesogenic compositions.

For this purpose, an inventive polymerizable composition is coated onto one substrate or between two substrates and aligned, which can easily be achieved by conventional techniques. The alignment is subsequently frozen in by curing of the composition to give anisotropic polymer films with uniform orientation. Curing can be achieved by exposure of the inventive thermochromic polymerizable mesogenic compositions to actinic radiation in the presence of an initiator absorbing at the wavelength of said radiation.

A detailed description of this method can be found in D. J. Broer et al., Makromol. Chem., 190:2255ff. (1989).

As a substrate, for example, a glass or quartz sheet as well as a plastic film or sheet can be used. It is also possible to put a second substrate on top of the coated mixture prior to, during and/or after polymerization. The substrates can be removed after polymerization or not. When using two substrates in case of curing by actinic radiation, at least one substrate has to be transmissive for the actinic radiation used for the polymerization.

Isotropic or birefringent substrates can be used. In case the substrate is not removed from the polymerized film after polymerization, preferably isotropic substrates are used.

It is also possible to use plastic films as substrates, for example, plastic films that can be used in film production, e.g., polyester films such as polyethyleneterephthalate (PET), or films of polyvinylalcohol (PVA), polycarbonate (PC) or triacetylcellulose (TAC). As a birefringent substrate, for example, an uniaxially stretched plastic film can be used. Preferably, at least one substrate is a plastic substrate, especially preferably a PET film or a TAC film. PET films are commercially available, e.g., from ICI Corp. under the tradename Melinex.

The coated layer of the inventive mixture of the polymerizable mesogenic material is preferably aligned to give a planar orientation, i.e., an orientation so that the axis of the molecular helix extends transversely to the layer.

A planar orientation can be achieved, for example, by shearing the material, e.g., by means of a doctor blade. It is also possible to apply an alignment layer, for example, a layer of rubbed polyimide or sputtered SiOX, on top of at least one of the substrates.

In another preferred embodiment, a second substrate is put on top of the coated material. In this case, the shearing caused by putting together the two substrates is sufficient to give good alignment.

Polymerization of the inventive polymerizable mesogenic mixture takes place by exposing it to actinic radiation in the presence of an initiator absorbing at the wavelength of said radiation.

Actinic radiation means irradiation with light, like UV light, IR light or visible light, irradiation with X-rays or gamma rays or irradiation with high energy particles, such as ions or electrons. As a source of actinic radiation, for example, a single UV lamp or a set of UV lamps can be used. Another possible source for actinic radiation is a laser, e.g., a UV laser, an IR laser or a visible laser.

For example, when polymerizing by means of UV light, a photoinitiator can be used that decomposes under UV irradiation to produce free radicals or ions that start the polymerization reaction.

It is also possible to use a cationic photoinitiator, when curing reactive mesogens with, for example, vinyl and epoxide reactive groups, that photocures with cations instead of free radicals.

As a photoinitiator for radical polymerization, for example, the commercially available Irgacure 651, Irgacure 184, Darocure 1173 or Darocure 4205 (all from Ciba-Geigy AG) can be used, whereas in case of cationic photopolymerization the commercially available UVI 6974 (Union Carbide) can be used.

In some cases, it is of advantage to apply a second substrate not only to aid alignment of the polymerizable composition but also to exclude oxygen that may inhibit the polymerization. Alternatively, the curing can be carried out under an atmosphere or inert gas. However, curing in air is also possible using suitable photoinitiators and high lamp power. When using a cationic photoinitiator oxygen exclusion most often is not needed, but water should be excluded.

In a preferred embodiment of the invention, the polymerization of the polymerizable mesogenic material is carried out under an atmosphere of inert gas, preferably under a nitrogen atmosphere.

In addition to light sensitive initiators, the thermochromic polymerizable mesogenic composition according to the present invention may also comprise one or more other suitable components such as, for example, catalysts, stabilizers, chain-transfer agents, co-reacting monomers or surface-active compounds.

In a preferred embodiment of the invention, the thermochromic polymerizable mesogenic composition comprises a stabilizer that is used to prevent undesired spontaneous polymerization, for example, during storage of the composition. As stabilizers in principal, all compounds can be used that are known to the skilled in the art for this purpose. These compounds are commercially available in a broad variety. Typical examples for stabilizers are 4-ethoxyphenol or butylated hydroxytoluene (BHT).

It is also possible, in order to increase crosslinking of the polymers, to add up to 20% of a non-mesogenic compound with two or more polymerizable functional groups to the polymerizable composition alternatively or additionally to the multifunctional polymerizable mesogenic compounds.

Typical examples for difunctional non-mesogenic monomers are alkyldiacrylates or alkyldimethacrylates with alkyl groups of 1 to 20 C atoms. Typical examples for non-mesogenic monomers with more than two polymerizable groups are trimethylpropanetrimethacrylate or pentaerythritoltetraacrylate.

Polymerization of inventive compositions comprising compounds with only one polymerizable functional group leads to linear polymers, whereas in the presence of compounds with more than one polymerizable functional group crosslinked polymers are obtained.

By varying the concentration of the multifuinctional mesogenic or non-mesogenic compounds, the crosslink density of the polymers and thereby their physical and chemical properties such as the glass transition temperature, thermal and mechanical stability or the solvent resistance can be tuned easily.

In particular, polymer films comprising crosslinked polymers show very high thermal stability of the optical and mechanical properties, depending on the degree of crosslinking, when compared to linear polymers. For example, when an inventive thermochromic composition comprising a polymerizable mesogenic compound having two polymerizable groups is polymerized, the helical structure of the chiral mesophase of the composition upon polymerization is fixed and a polymer film is obtained that shows a helical pitch that is remaining substantially constant upon temperature variation.

In a preferred embodiment of the present invention, the thermochromic polymerizable mesogenic composition comprises at least one compound of component MA selected from formula I having at least two polymerizable mesogenic groups and/or at least one compound of component MB selected from formula III having at least two polymerizable mesogenic groups. Such a composition upon polymerization gives crosslinked polymers.

The inventive polymerizable mesogenic compositions are characterized in that they show thermochromic behavior. This behavior is shown by compositions or compounds that exhibit a chiral liquid crystalline phase or chiral mesophase, e.g., a chiral smectic phase or a chiral nematic (=cholesteric) phase, with a helically twisted molecular structure that shows selective reflection of a specific waveband of light, wherein the pitch of the molecular helix and thereby the reflected wavelengths are depending on the temperature.

Especially preferred are inventive thermochromic compositions that exhibit a cholesteric phase. Of these preferred compositions, further preferred are compositions that exhibit a cholesteric phase and a smectic phase, most preferable a chiral smectic phase, at temperatures below the temperature range of the cholesteric phase.

The inventive thermochromic compositions can show positive temperature dependency of the pitch, which means that the pitch increases with increasing temperature, or alternatively they can exhibit negative temperature dependency, which means that the pitch decreases with increasing temperature.

Thus, upon heating or cooling of an inventive thermochromic composition in its chiral mesophase, a shift of the reflection maximum of the wavelengths reflected by the composition to higher or lower values is observed.

In a preferred embodiment of the present invention, the thermochromic polymerizable mesogenic composition exhibits a chiral mesophase with negative temperature dependency of the pitch, i.e., the pitch decreases with increasing temperature.

In another preferred embodiment of the present invention, the thermochromic polymerizable mesogenic composition exhibits a chiral mesophase with positive temperature dependency of the pitch, i.e., the pitch increases with increasing temperature.

In the case where the reflection maximum of the composition is in the visible range of light, a color change of the composition upon heating or cooling within its chiral mesophase is observed.

The above-mentioned color changes can be observed not only for the reflective colors of the composition, but also for the complementary secondary colors of the composition when being viewed in transmission (e.g., against a light source), e.g., if the inventive thermochromic composition is coated as a thin film onto a transparent substrate.

The pitch length and the thermochromic behavior of the inventive thermochromic polymerizable compositions can be influenced by the ratio of the achiral compounds to the chiral compounds in the composition. With increasing ratio of the chiral compounds usually the pitch length of the composition as well as the pitch length of the polymers and polymer films obtainable from this composition is decreasing.

It is also possible to add, for example, a quantity of up to 20% by weight of a non-polymerizable liquid-crystalline compound to adapt the optical properties of the polymers and polymer films obtainable from these compositions.

In some cases, it is useful to add one or more non-polymerizable chiral compounds, preferably non-polymerizable chiral mesogenic compounds, to the inventive thermochromic composition to influence the pitch length and the thermochromic behavior of the composition and of the polymers and polymer films obtainable from this composition.

In a preferred embodiment of the present invention, the inventive thermochromic composition additionally comprises 0 to 30%, preferably 0 to 20%, in particular 0.1 to 20%, very preferably 0.5 to 15% by weight of at least one non-polymerizable chiral or chiral mesogenic compound.

As a non-polymerizable chiral mesogenic compound, in principal all compounds can be used that are known to the skilled in the art for this purpose. Typical compounds are, e.g., the commercially available chiral dopants S 1011, R 811 or CB 15 (Merck KGaA, Darmstadt, Germany).

As non-polymefizable chiral mesogenic compounds, preferably one or more chiral dopants are added to the inventive composition that comprise a chiral group MG* and/or R* as given in formula III.

Further preferred chiral dopants are selected from formula VI

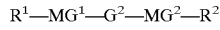

$$R^1—MG^1—G^2—MG^2—R^2 \qquad \text{VI}$$

wherein $MG^1$ and $MG^2$ each independently have one of the meanings of MG in formula II, $R^1$ and $R^2$ are each independently halogen, cyano or an optionally halogenated alkyl, alkoxy or alkanoyl group with 1 to 12 C atoms, and $G^2$ has the meaning of formula IIb. Very preferably, $G^2$ is a chiral bivalent structure element based on a sugar molecular.

Upon polymerization, the cholesteric structure and the reflection maximum of an inventive composition can be fixed, as described above. When an inventive thermochromic composition is polymerized in the cholesteric phase at different temperatures, polymer films are obtained that exhibit different reflection maxima of the wavelengths reflected by the films. If the different reflection maxima of the polymer films are in the visible wavelength range, films of different color are obtained.

Alternatively, it is possible to polymerize different parts of the same thermochromic composition at different temperatures and thereby to obtain a polymer film exhibiting different parts with different reflective colors.

Thus, by polymerization of an inventive thermochromic polymerizable composition, it is possible to prepare a polymer films with a reflection maximum that can be tuned easily by varying the polymerization temperature and/or the ratio of the chiral and achiral components of the composition.

Another object of the present invention is a process to prepare an anisotropic polymer film with a chiral mesophase from the inventive thermochromic polymerizable mesogenic composition. This process preferably implies the following steps:

A) coating a thernochromic polymerizable mesogenic composition as described above and below on a substrate or between two substrates in the form of a layer, B) aligning the polymerizable mesogenic composition so that the axis of the molecular helix extends transversely to the layer, C) heating at least a part of the aligned composition to a defined temperature, D) polymerizing at least a part of the aligned composition by exposure to actinic radiation, E) optionally repeating, at least one more time, (D) alone or in combination with (C) or (A), (B) and (C), and F) optionally removing the substrate or, if present, one or two of the substrates from the polymerized material.

A preferred embodiment of the present invention relates to a process as described above, wherein the coated and aligned layer of the inventive thermochromnic polymerizable mesogenic composition is heated in step C) to a defined temperature within the chiral mesophase of the composition, and wherein during subsequent polymerization in step D) a part of the layer is covered with a photomask that is not transmissive for the actinic radiation used for polymerization. Thereby, only he unmasked portions of the layer are polymerized and the helical pitch and the reflection maximum in these unmasked portions of the layer are fixed.

The photomask is then removed, the layer is heated or cooled to a temperature that is different from that of the previous step C) and the parts of the layer that remained unmasked during the previous step D) are polymerized.

The steps C) and D) of the process according to this preferred embodiment can be repeated at least one more time, wherein the layer in each repeated step C) is heated or cooled to a temperature that is different from the previous step C), and in each repeated step D) a part of the layer is masked during polymerization that is different from the part of the layer that was masked in the previous step D).

Particularly preferred is a process according to this preferred embodiment wherein steps C) and D) are repeated at least two times.

According to this preferred embodiment, a polymer film exhibiting a chiral mesophase with a pattern of the helical pitch is obtained, i.e., a polymer film in which at least one of the different parts that have been masked during one of the polymerization steps D) exhibits a reflection maximum that is different from the reflection maxima of at least one of the parts that have been masked during the other polymerization steps D) and/or from the unmasked parts.

Another preferred embodiment of the present invention is related to a process for preparing a polymer film as described above, in which as a substrate in step A) another polymer film is used that was prepared in analogy to the process comprising steps A) to F) described above.

Thus, it is possible to prepare a multilayer of polymer films with a chiral mesophase with a pattern of the helical pitch, i.e., a multilayer of films wherein each of the layers comprises at least one region with a reflection maximum that is different from at least one other region of the same layer and/or of at least one other layer.

In another preferred embodiment of the present invention, a photomask is used that comprises different parts having different transmission of the actinic radiation used for polymerization. As a photomask, it is possible to use, e.g., a black and white photocopy or photograph that is printed or copied on a transparent material and exhibits different grey shades.

Preferably, the photomask exhibits at least two, very preferably at least five, in particular at least ten different parts having different transmission of the actinic radiation used for polymerization of the inventive thermochromic polymerizable composition.

The photomask is put on the inventive thermochromic polymerizable mesogenic composition prior to polymerization, and the composition is irradiated at a given temperature with a burst of actinic radiation that is short enough so that only he parts of the polymerizable composition beneath the most transparent parts of the photomask are polymerized, freezing in the reflection color at this temperature, whereas the other parts of the composition remain unpolymerized.

The mixture is then heated or cooled, whereby the unpolymerized parts of the thermochromic mixture undergo a change of the reflection maximum and the reflective color, and the mixture is exposed to another burst of actinic radiation, so that the parts of the mixture beneath the less transparent parts of the photomask are polymerized and their color is frozen in.

If the process comprising the above-described heating/cooling and polymerization steps is repeated several times, a multicolor image can be obtained. The number of different colors and the color shades of such a multicolor image can be controlled by adjusting the process parameters, such as the intensity of the actinic radiation used in each polymerization step, the number and intensity of the grey scales of the photomask, the polymerization temperature at each step, and the total number of the heating and polymerization steps.

Another preferred embodiment of the present invention relates to a process comprising steps A) to F) described above, wherein in step D), one or more selected parts of the layer are polymerized by exposure to actinic radiation that is emitted by a finely focused irradiation source, for example, a laser beam.

The polymerizable composition according to this preferred embodiment should preferably comprise a photoinitiator that shows absorption of the emission wavelength of the laser used for polymerization.

Another particularly preferred embodiment of the present invention relates to a process comprising steps A) to F) described above, wherein in step C), one or more selected parts of the coated and aligned layer of the inventive thermochromic composition are heated to a defined temperature by exposure to a finely focused irradiation source, for example, a laser beam.

The parts of the layer that are selectively heated in step C) by a laser beam according to this particularly preferred embodiment are very preferably polymerized in step D) by exposure to a second laser beam that immediately traces the path of the first laser beam that was used in step C).

For example, for this particularly preferred embodiment, an inventive composition can be used that comprises an IR dye and a photoinitiator absorbing visible light, e.g., Irgacure 1700 (Ciba Geigy AG). The heating of a selected part of the coated composition is carried out with an IR laser, and polymerization of the heated parts is achieved with a visible laser following the IR laser.

Further preferred is a process according to this particularly preferred embodiment wherein the heating of one or more selected parts of the layer and the polymerization of these selectively heated parts of the layer are achieved by irradiation with the same laser.

In order to effectively absorb the irradiation of the laser that is used for heating selected parts of the layer according to the preferred embodiments described above, the thermochromic polymerizable mesogenic composition preferably comprises a dye component that comprises one or more dye compounds and is absorbing at the emission wavelength of the laser that is used for heating selected parts of the layer in step C) of the above-described process.

As a suitable dye, for example, an IR dye, a UV dye or a dye absorbing in the visible wavelength range can be used. A dichroic dye can also be used. The dye component should be adjusted to exhibit absorption in the range of the wavelength emitted from the laser.

Suitable dye compounds are described in the literature and can be chosen, for example, from the group of benzophenones, benzotriazoles, cinnamic and salicylic acids and their respective derivatives, anthraquinone and azo or azoxy dyes, organic Ni complex compounds, natural substances such as, for example, umbelliferon and yellow dyes, for example, methyl yellow.

In a particularly preferred embodiment of the present invention, the thermochromic polymerizable mesogenic composition comprises a dye component that comprises one or more dye compounds that are absorbing in the IR wavelength range, e.g., the commercially available SC 100870 (ICI Corp.) or, e.g., the following compounds:

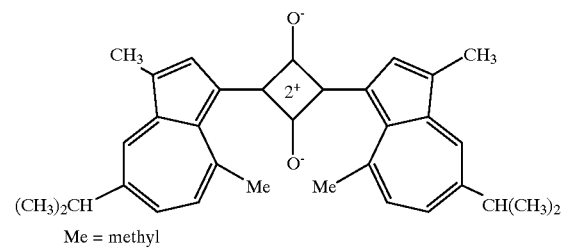

Me = methyl

-continued

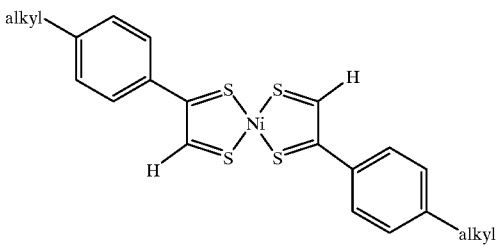

In another preferred embodiment of the invention, a dye component is used that comprises one or more dye compounds that show absorption of He—Ne light (633 nm), e.g., the following compounds:

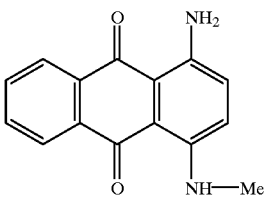

Me = methyl

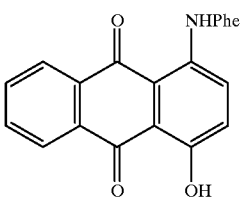

Phe = phenyl

In another preferred embodiment of the invention, a dye component is used that comprises one or more dye compounds showing absorption of UV light, e.g., the following dye compounds:

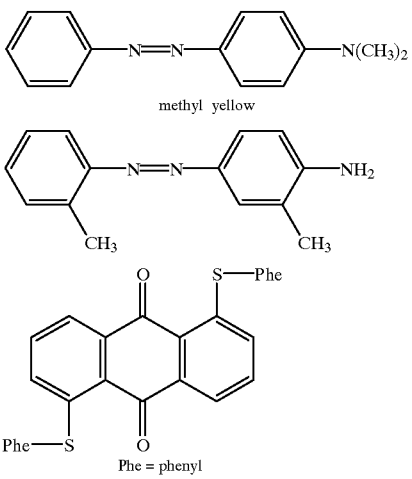

Phe = phenyl

It is also possible to use a semiconductor laser with an emission wavelength in the range between 750 and 950 nm and a dye component adjusted to significantly absorb in this wavelength range.

The examples of dye compounds given above should be taken only as illustrative and are in no way intended to restrict, but instead to explain the present invention.

In another preferred embodiment of the invention, the thermochromic polymerizable mesogenic composition preferably comprises a dye component comprising one or more dye compounds that are absorbing at the emission wavelength of the laser that is used for polymerization in step D) of the above-described process. This dye component can effectively absorb the irradiation of the laser that is used for polymerization in order to reduce the curing time and/or to increase the polymerization rate.

This dye component is preferably chosen to be adjusted to exhibit a significant absorption in the range of the wavelength emitted from the laser that is used for polymerization in step D) as described above. In principal, all the types and examples of dye compounds mentioned above can be used for this purpose.

In another preferred embodiment, a photoinitiator is used in order to both absorb the emission wavelength of the laser used for heating the polymerizable composition and start the polymerization reaction.

If the inventive compositions comprise a dye component described above and below, the ratio of the dye component is preferably 0.1 to 20%, very preferably 0.5 to 10%, in particular 1 to 5% by weight of the total mixture.

The dye component is preferably comprising one to six, very preferably one to three, in particular one or two dye compounds. Most preferably, a single dye compound is used.

A polymerized film obtainable from an inventive thermochromic polymerizable mesogenic composition by a process according to one of the preferred embodiments or according to one of the examples as described above and below exhibits special color properties.

For example, the film exhibits one or more reflection colors, which can be seen particularly well when being viewed against a dark background, and also shows the corresponding complementary colors when being viewed in transmission.

Furthermore, when being viewed against a dark background, such a film exhibits a color shift to shorter wavelengths.

Due to these special properties, which are very difficult to reproduce by other than the above-described inventive methods, the inventive polymerized films are particularly suitable for security applications, such as false-proof identity or credit cards, banknotes, watermarks, etc.

In particular, a multicolor image prepared by a multi-step curing process and by using a photomask exhibiting various grey shades, as described in the above-preferred embodiment, is suitable for use in security applications.

BRIEF DESCRIPTION OF THE DRAWINGS

The file of this patent contains at least one figure executed in color. Copies of this patent with color figure(s) will be provided by the Patent and Trademark Office upon request and payment of the necessary fee.

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1.1 shows the change of the reflective color versus the temperature of a thermochromic polymerizable mixture according to Example 1 of the present invention;

FIG. 1.2 shows the transmission spectra of polymer films obtained by curing a polymerizable thermochromic mixture according to Example 1 of the present invention at different temperatures;

FIG. 4.1 shows a photomask used for the preparation of a multicolor image according to Example 4 of the present invention;

FIG. 4.2 shows a multicolor image according to Example 4 of the present invention when being viewed against a dark background;

FIG. 4.3 shows a multicolor image according to Example 4 of the present invention when being viewed in transmission; and FIG. 4.4 shows a multicolor image according to Example 4 of the present invention when being viewed against a dark background at an oblique angle.

Figure 2:
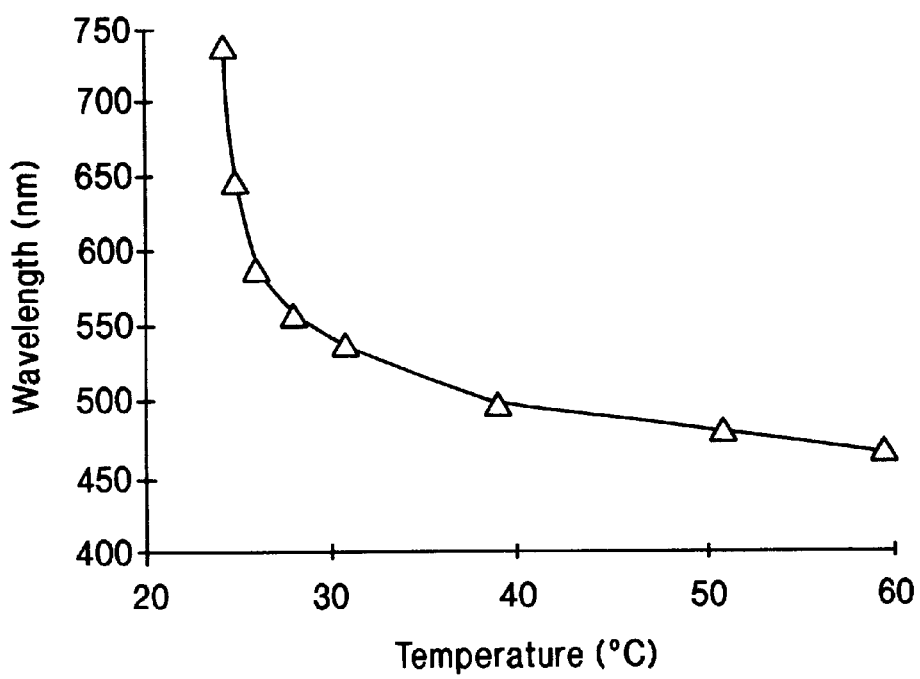
FIG. 2 shows the change of the reflective color versus the temperature of a thermochromic polymerizable mixture according to Example 3 of the present invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding European application 96112001.1, filed Jul. 25, 1996, are hereby incorporated by reference.

The following abbreviations are used to illustrate the liquid crystalline phase behavior of the compounds: K=crystalline; N=nematic; S=smectic; Ch=cholesteric; I=isotropic. The numbers between these symbols indicate the phase transition temperatures in degrees Celsius.

EXAMPLES

Example 1

The following mixture is formulated:

compound (1) 16.5%
compound (2) 11.0%
compound (3) 55.0%
compound (4) 12.0%
compound (5) 5.0%
Irgacure 651 0.5%

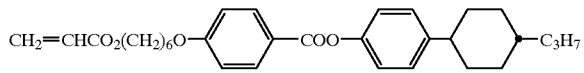
(1)

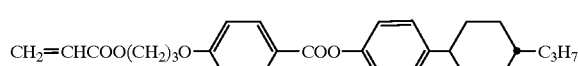
(2)

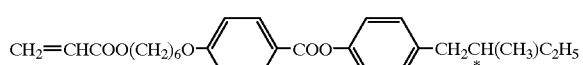
(3)

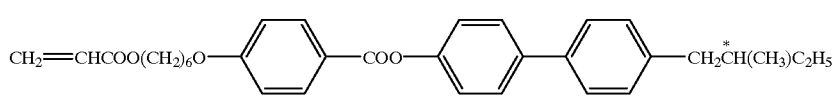
(4)

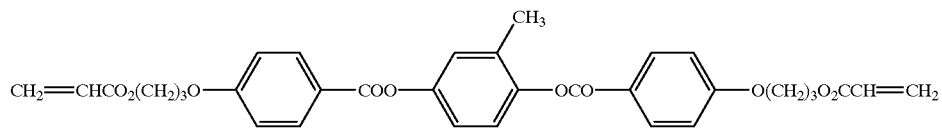
(5)

The compounds (1) and (2) are prepared in analogy to the methods described in WO 93/22397 and DE 195 04 224.

Irgacure is a photoinitiator commercially available from Ciba Geigy AG (Basel, Switzerland).

The mixture shows the liquid crystal phase behavior S 26.7 Ch 67.1 I.

The mixture exhibits the following color appearance when heated from the smectic phase (the numbers are temperature values in ° C.):

Smectic 26.7 Cholesteric Phase, Red 29 Light Green 31 Bright Green 41

Light Blue 50 Deep Blue 59 Violet Blue 67.2 Isotropic Phase.

The central wavelength of the reflective color shown by a thin film of this mixture at different temperatures was measured and is shown in FIG. 1.1.

Polymer films of different color are prepared by filling samples of the mixture between two glass plates and curing by exposure to UV radiation at different temperatures.

The colors of 3 polymer films prepared at. different temperatures as described above are shown in the following table.

| Film No. | Curing Temperature (° C.) | Color |
|---|---|---|
| 1a | 27 | red |
| 1b | 33 | green |
| 1c | 50 | blue |

FIG. 1.2 shows the transmission spectra of the film samples 1a, 1b and 1c obtained as described above.

Example 2

The following mixture is formulated:
compound (1) 15.0%
compound (2) 9.5%
compound (3) 45.0%
compound (4) 20.0%
compound (6) 10.0%
Irgacure 651 0.5%

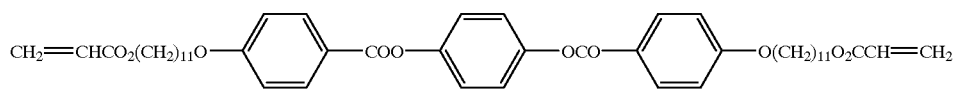

(6)

The compound (6) is prepared in analogy to the methods described in WO 93/22397 and DE 195 04 224.

The mixture shows the liquid crystal phase behavior S 30.3 Ch 80.8 I.

The mixture exhibits the followihg color appearance when heated from the smectic phase (the numbers are temperature values in ° C.);

Smectic Phase 30.3 Cholesteric Phase, Red 39 Light Green 31 Bright

Green 41 Light Blue 50 Deep Blue 59 Violet Blue 67.2 Isotropic Phase.

Polymer films of different color are prepared by filling samples of the mixture between two glass plates and curing by exposure to UV radiation at different temperatures.

The colors of 3 polymer films prepared at different temperatures as described above are shown in the following table.

| Film No. | Curing Temperature (° C.) | Color |
|---|---|---|
| 2a | 38 | red |
| 2b | 46 | green |
| 2c | 76 | blue |

Example 3

The following mixture is formulated:
compound (1) 18.0%
compound (2) 12.0%
compound (3) 50.5%
compound (4) 13.5%
compound (5) 5.0%
Irgacure 369 1.0%
Irgacure 369 is a photoinitiator available from Ciba Geigy AG.

The mixture shows the liquid crystalline phase behavior S 24 Ch 65 I.

The color appearance of the mixture in the cholesteric phase when heated from the smectic phase is depicted in FIG. 2.

The mixture can be cured by LV irradiation as described in Examples 1 and 2 at different temperatures selected from the curve in FIG. 2 to give polymer films of different colors.

Example 4

Figure 3:
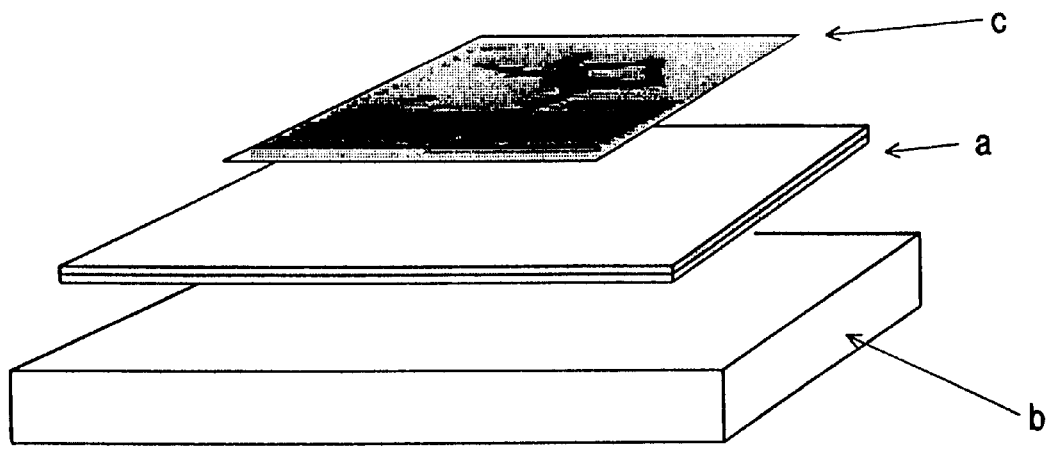
FIG. 3 shows a layered structure of photomask, film and substrate and heated base plate used to effect polymerization.

A thin film of the polymerizable mixture of Example 1 with a thickness of 5 $\mu$m is prepared between two polyester substrates (Melinex 401, 100 $\mu$m). As illustrated by FIG. 3, the sample (3a) comprising the film and the substrates is placed onto a temperature controlled plate (3b) at 22° C. to give a red reflection color when viewed at normal incidence. A black and white photocopy onto a clear acetate film (standard foil used for overhead projection) is prepared from a photograph as shown in FIG. 4.1 and placed as a photomask (3c) directly onto the sample as depicted in FIG. 3.

The sample comprising the film of the polymerizable mixture and the mask are irradiated for 2 seconds with UV light from a metal halide source (irradiance 50 mW/cm$^2$), which causes the areas of the film of the polymerizable mixture beneath the most transparent parts of the photomask to polymerize and thus freezes in the red reflection color in these areas.

The temperature of the hot plate is increased to 23° C., which leads to an orange/yellow color shift in the unpolymerized parts of the mixture. The system of the sample and the photomask is again irradiated with a short burst of UV light as described above, which causes the parts of the polymerizable mixture beneath the less transparent areas of the photomask to polymerize and thus freezes in the new color.

This process of increasing the temperature of the hot plate to give a different reflective color and then irradiating with a short burst of UV light is repeated at 25° C., 30° C. and 35° C. The mask is then removed and final burst of UV irradiation is given at 40° C. to polymerize any areas of the sample which have not fully polymerized up to that point.

In this way, a multicolor image as shown in FIG. 4.2 is produced with the color at any given area being determined by the relative opacity of the mask to UV light.

When the sample is held against a bright background, the complementary colors of the reflection colors of the different parts of the sample are revealed as shown by FIG. 4.3.

When being viewed against a dark background at oblique angles, the sample shows a color shift to shorter wavelengths as shown by FIG. 4.4.

Both the feature of complementary colors when viewed in transmission as depicted in FIG. 4.3 and the color shift to shorter wavelengths when viewed at oblique angles as depicted in FIG. 4.4 are very difficult to reproduce by other methods. Thus, a multicolor image prepared as described above is well suitable in security applications, such as, e.g., false-proof identity cards, credit cards, banknotes, watermarks, etc.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermochromic polymerizable mesogenic composition comprising:
   a) a component MA comprising at least one achiral polymerizable mesogenic compound having at least one polymerizable functional group,
   b) a component MB comprising at least one chiral polymerizable mesogenic compound having at least one polymerizable functional group,
   c) a photoinitiator, and
   d) optionally a dye component, wherein the chiral polymerizable compound of component MB is one of formula III P—(Sp—X)$_n$—MG*—R*    III in which
   P is CH$_2$=CW—COO—, WCH=CH—O—,

or CH$_2$=CH—phenyl-(O)$_k$—,
   W is H, CH$_3$ or Cl,
   k is 0 or 1,
   Sp is a spacer group having 1 to 20 C atoms,
   X is —O—, —S—, —CO—, —COO—, —OCO—, —OCO—O—, —S—CO—, —CO—S— or a single bond,
   n is 0 or 1
   MG*—R* is —(A$^1$—Z$^1$)$_i$—G$^2$—(Z$^1$—A$^2$)$_j$—R    IIb, wherein
   Z$^1$ is independently —COO—, —OCO—, —CH$_2$CH$_2$—, —OCH—, —CHO$_2$—, —CH=CH—, —CH=CH—COO—, —OCO—CH=CH—, —C≡C— or a single bond,
   A$^1$ and A$^2$ are each independently 1,4-phenylene in which one or more CH groups are optionally replaced by N, 1,4-cyclohexylene in which one or two non-adjacent CH$_2$ groups are optionally replaced by O and/or S, 1,4-cyclohexenylene, or naphthalene-2,6-diyl, A$^1$ and A$^2$ being unsubstituted, mono- or polysubstituted with halogen, cyano or nitro groups or alkyl, alkoxy or alkanoyl groups having 1 to 7 C atoms in which one or more H atoms are optionally substituted by F or Cl,
   R is halogen, cyano, an achiral alkyl radical with up to 25 C atoms, unsubstituted, mono- or polysubstituted by halogen or CN, one or more non-adjacent CH$_2$ groups optionally being replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, G$^2$ is

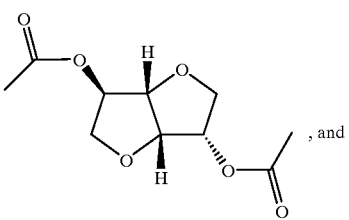, and i and j are each independently 0, 1 or 2, with the proviso that Z$^1$ is not —COO—, —OCO— or —CH=CH—COO— where Z$^1$ is adjacent to G$^2$.

2. A thermochromic polymerizable mesogenic composition according to claim 1, wherein the achiral polymerizable compound of component MA is one of formula I P—(Sp—X)$_n$—MG—R    I in which
P is CH$_2$=CW—COO—, WCH=CH—O—,

or CH$_2$=CH—phenyl-(O)$_k$—,
W is H, CH$_3$ or Cl,
k is 0 or 1,
Sp is a spacer group having 1 to 20 C atoms,
X is —O—, —S—, —CO—, —COO—, —OCO—, —OCO—O—, —S—CO—, —CO—S— or a single bond,
n is 0 or 1,
MG is a mesogenic or mesogenity supporting group of formula II —(A$^1$—Z$^1$)$_m$—A$^2$—    II wherein
Z$^1$ is independently —COO—, —OCO—, —CH$_2$CH$_2$—, —OCH$_2$—, —CH$_2$O—, —CH=CH—, —CH=CH—COO—, —OCO—CH=CH—, —C≡C— or a single bond,
A$^1$ and A$^2$ are each independently 1,4-phenylene in which one or more CH groups are optionally replaced by N, 1,4-cyclohexylene in which one or two non-adjacent CH$_2$ groups are optionally replaced by O and/or S, 1,4-cyclohexenylene, or naphthalene-2,6-diyl, A$^1$ and A$^2$ being unsubstituted, mono- or polysubstituted with halogen, cyano or nitro groups or alkyl, alkoxy or alkanoyl groups having 1 to 7 C atoms in which one or more H atoms are optionally substituted by F or Cl, and
m is 0, 1, 2 or 3, and
R is halogen, cyano, an achiral alkyl radical with up to 25 C atoms, unsubstituted, mono- or polysubstituted by halogen or CN, one or more non-adjacent CH$_2$ groups optionally being replaced, in each case independently from one another, by —O—, —S—, —NH—, —N(CH$_3$)—, —CO—, —COO—, —OCO—, —OCO—O—, —S—CO—, —CO— or —C≡C— in such a manner that oxygen atoms are not linked directly to one another, or R has independently one of the meanings given for P—(Sp—X)$_n$—.

3. A thermochromic polymerizable mesogenic composition according to claim 2, wherein mesogenic group MG is

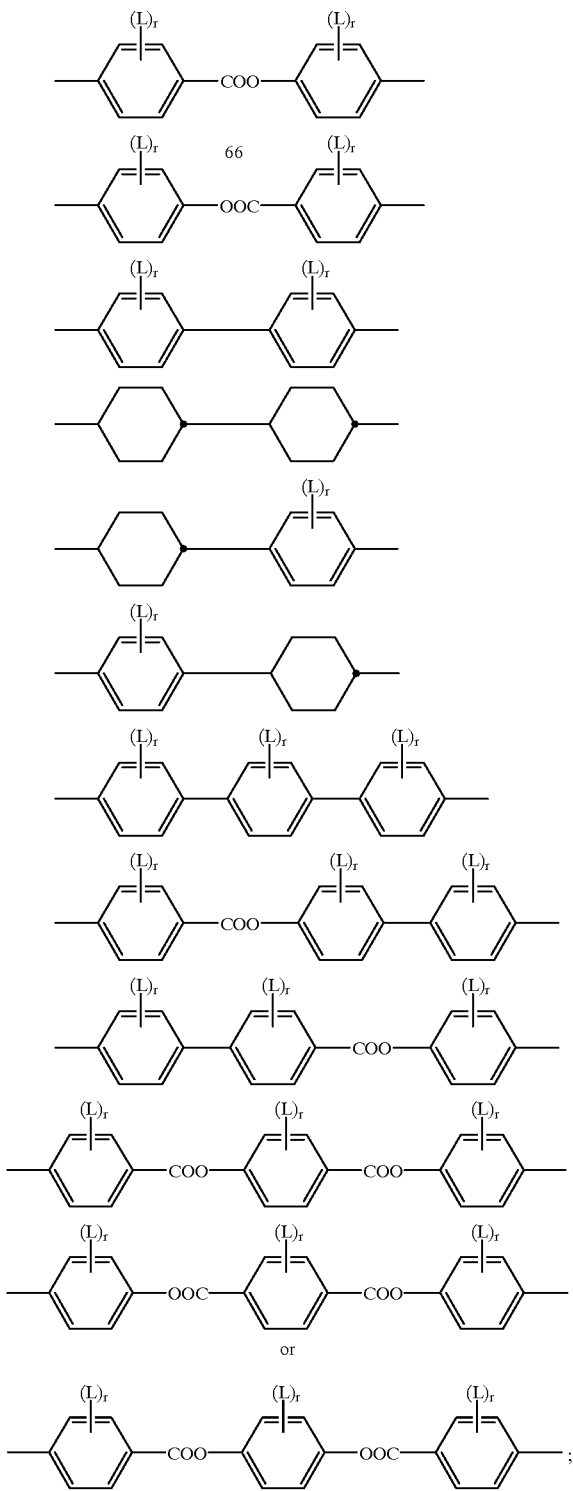

wherein L in each case independently denotes halogen, a cyano or nitro group or an alkyl, alkoxy or alkanoyl group having 1 to 7 C atoms wherein at least one H atom may be substituted by F or Cl, and r is 0, 1 or 2.

4. A thermochromnic polymerizable mesogenic composition according to claim 1, comprising at least one polymerizable mesogenic compound MA or MB having two or more polymerizable functional groups.

5. A thermochromic polymerzable composition according to claim 2, wherein P is a vinyl group, an acrylate group, a methacrylate group, a propenyl ether group or an epoxy group.

6. A thermochromic polymerizable composition according to claim 1, wherein P is a vinyl group, an acrylate group, a methacrylate group, a propenyl ether group or an epoxy group.

7. A thermochromic polymerizable composition according to claim 2, wherein MG has the formula $$—A^1—Z^1—A^2— \qquad \text{II1}$$

$$—A^1—Z^1—A^1—Z^1—A^2— \qquad \text{II2 or}$$

$$—A^1—Z^1—A^1—Z^1—A^1—Z^1—A^2— \qquad \text{II3.}$$

8. A thermochromic polymerizable composition according to claim 2, wherein Sp is a linear or branched $C_{1-20}$-alkylene group in which at least one non-adjacent $CH_2$ group is optionally —O—, —S—, —NH—, —N(CH$_3$)—, —CO—, —O—CO—, —S—CO—, —O—COO—, —CO—S—, —CO—O—, —CH(halogen)—, —CH(CN)—, —CH=CH— or —C≡C—.

9. A thermochromic polymerizable composition according to claim 2, wherein Sp is

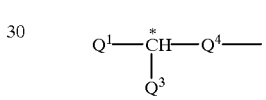

V wherein $Q^1$ and $Q^3$ have the meanings given in formula IV, and $Q^4$ is an alkylene or alkylene-oxy group with 1 to 10 C atoms or a single bond, being different from $Q^1$.

10. An anisotropic polymer obtainable by polymerizing a thermochromic polymerizable mesogenic composition according to claim 1.

11. A polymer film with a chiral mesophase exhibiting a helically twisted molecular structure, produced from a mesogenic composition according to claim 1.

12. A polymer film according to claim 11, obtainable by a process comprising:

A) coating a thermochromic polymerizable mesogenic composition comprising:
  a) a component MA comprising at least one achiral polymerizable mesogenic compound having at least one polymerizable functional group,
  b) a component MB comprising at least one chiral polymerizable mesogenic compound comprising at least one polymerizable functional group,
  c) a photoinitiator, and
  d) optionally a dye component on a substrate or between two substrates in the form of a layer;

B) aligning the polymerizable mesogenic composition so that the axis of the molecular helix extends transversely to the layer;

C) heating at least a part of the aligned composition to a defined temperature;

D) polymerizing at least a part of the aligned composition by exposure to actinic radiation, E) optionally repeating (D) at least once, alone or in combination with (C) or (A), (B) and (C), and F) optionally removing the substrate or substrates from the polymerized material.

13. A polymer film with a chiral mesophase and a helically twisted molecular structure according to claim 12, wherein at least one part of the film exhibits a pitch of the molecular helix that is different from at least one other part of the film.

14. A polymer film according to claim 13, exhibiting at least two different reflection maxima in the visible wavelength range.

15. A process according to claim 12, wherein in (D) the thermochromic polymerizable mesogenic composition is covered at least partially with a photomask.

16. A process according to claim 15, wherein the photomask exhibits at least one part having a transmission of the actinic radiation used in (D) that is different from at least one other part of the photomask.

17. A process according to claim 12, wherein (C) and (D) are carried out at least two times, the defined temperature in at least one (C) being different from the defined temperature in at least one other (C).

18. An optical data storage device, photomask, decorative pigment, cosmetic, security device, active or passive optical element, color filter, scattering display, adhesive or synthetic resin with anisotropic mechanical properties, comprising a thermochromic polymerizable mesogenic composition according to claim 1.

19. An optical data storage device, photomask, decorative pigment, cosmetic, security device, active or passive optical element, color filter, scattering display, adhesive or synthetic resin with anisotropic mechanical properties, comprising a anisotropic polymer according to claim 10.

20. An optical data storage device, photomask, decorative pigment, cosmetic, security device, active or passive optical element, color filter, scattering display, adhesive or synthetic resin with anisotropic mechanical properties, comprising a polymer film according to claim 11.

21. A composition according to claim 1, wherein $A^1$ and $A^2$ are 1,4-cyclohexylene, or 1,4-phenylene optionally substituted by one or two L groups, and L is F, Cl, CN, $NO_2$, $CH_3$, $C_2H_5$, $OCH_3$, $OC_2H_5$, $COCH_3$, $COC_2H_5$, $CF_3$, $OCF_3$, $OCHF_2$, or $OC_2F_5$.

22. A composition according to claim 1, wherein $Z^1$ is —OCO—, —COO—, —$CH_2CH_2$— or a single bond.

23. A composition according to claim 1, wherein Sp is —$(CH_2)_o$—, —$(CH_2CH_2O)_r$—$CH_2CH_2$—, —$CH_2CH_2$—S—$CH_2CH_2$— or —$CH_2CH_2$—NH—$CH_2CH_2$—, with o being an integer from 2 to 12 and r being an integer from 1 to 3.

24. A composition according to claim 23, wherein n is 1.

25. A composition according to claim 1, wherein R is $C_{2-8}$-alkyl or $C_{2-8}$-alkoxy.

26. A chiral polymerizable compound of formula III

P—(Sp—X)$_n$—MG*—R*  III in which
P is $CH_2$=CW—COO—, WCH=CH—O—,

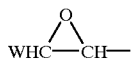

or $CH_2$=CH—phenyl-(O)$_k$—,
W is H, $CH_3$ or Cl,
k is 0 or 1,
Sp is a spacer group having 1 to 20 C atoms, X is —O—, —S—, —CO—, —COO—, —OCO—, —OCO—O—, —S—CO—, —CO—S— or a single bond, n is 0 or 1

MG*—R* is

—(A$^1$—Z$^1$)$_i$—G$^2$—(Z$^1$—A$^2$)$_j$—R  IIb, wherein
$Z^1$ is independently —COO—, —OCO—, —$CH_2CH_2$—, —$OCH_2$—, —$CH_2O$—, —CH=CH—, —CH=CH—COO—, —OCO—CH=CH—, —C≡C— or a single bond, $A^1$ and $A^2$ are each independently 1,4-phenylene in which one or more CH groups are optionally replaced by N, 1,4-cyclohexylene in which one or two non-adjacent $CH_2$ groups are optionally replaced by O and/or S, 1,4-cyclohexenylene, or naphthalene-2,6-diyl, $A^1$ and $A^2$ being unsubstituted, mono- or polysubstituted with halogen, cyano or nitro groups or alkyl, alkoxy or alkanoyl groups having 1 to 7 C atoms in which one or more H atoms are optionally substituted by F or Cl, R is halogen, cyano, an achiral alkyl radical with up to 25 C atoms, unsubstituted, mono- or polysubstituted by halogen or CN, one or more non-adjacent $CH_2$ groups optionally being replaced, in each case independently from one another, by —O—, —S—, —NH—, —N($CH_3$)—, —CO—, —COO—, —OCO—, —OCO—O—, —S—CO—, —CO—S— or —C≡C— in such a manner that oxygen atoms are not linked directly to one another, $G^2$ is

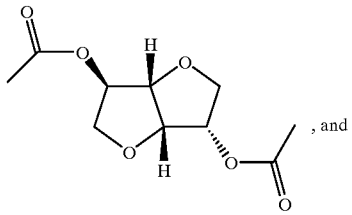

, and i and j are each independently 0, 1 or 2, with the proviso that $Z^1$ is not —COO—, —OCO— or —CH=CH—COO— where $Z^1$ is adjacent to $G^2$.

27. A compound according to claim 26, wherein P is a vinyl group, an acrylate group, a methacrylate group, a propenyl ether group or an epoxy group.

28. A compound according to claim 27, wherein $A^1$ and $A^2$ are 1,4-cyclohexylene, or 1,4-phenylene optionally substituted by one or two L groups, and L is F, Cl, CN, $NO_2$, $CH_3$, $C_2H_5$, $OCH_3$, $OC_2H_5$, $COCH_3$, $COC_2H_5$, $CF_3$, $OCF_3$, $OCHF_2$, or $OC_2F_5$.

29. A compound according to claim 27, wherein $Z^1$ is —OCO—, —COO—, —$CH_2CH_2$— or a single bond.

30. A compound according to claim 27, wherein Sp is —$(CH_2)_o$—, —$(CH_2CH_2O)_r$—$CH_2CH_2$—, —$CH_2CH_2$—S—$CH_2CH_2$— or —$CH_2CH_2$—NH—$CH_2CH_2$—, with o being an integer from 2 to 12 and r being an integer from 1 to 3.

31. A compound according to claim 30, wherein n is 1.

32. A compound according to claim 27, wherein R is $C_{2-8}$-alkyl or $C_{2-8}$-alkoxy.

* * * * *

UNITED STATES PATENT AND TRADEMARK OFFICE
CERTIFICATE OF CORRECTION

PATENT NO. : 6,316,066 B1
DATED : November 13, 2001
INVENTOR(S) : Jolliffe et al.

It is certified that error appears in the above-identified patent and that said Letters Patent is hereby corrected as shown below:

<u>Column 27,</u>
Line 44, change "—OCH—" to -- —OCH$_2$— --; change "—CHO$_2$—" to -- —CH$_2$O— --.

<u>Column 28,</u>
Line 64, change "—CO—" to -- —CO—S— --.

<u>Column 29,</u>
Line 9, change "66" to -- (L)$_{66}$ --;
Line 66, change "thermochromnic" to -- thermochromic --.

Signed and Sealed this

First Day of October, 2002

*Attest:*

*Attesting Officer*

JAMES E. ROGAN
*Director of the United States Patent and Trademark Office*